(12) United States Patent
Duan et al.

(10) Patent No.: US 11,305,675 B2
(45) Date of Patent: Apr. 19, 2022

(54) DISTURBANCE CANCELLATION AND GENERATION SEAT

(71) Applicant: GM Global Technology Operations LLC, Detroit, MI (US)

(72) Inventors: Chengwu Duan, Shanghai (CN); Jian Yao, Shanghai (CN); David Sun, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 371 days.

(21) Appl. No.: 16/509,110

(22) Filed: Jul. 11, 2019

(65) Prior Publication Data

US 2020/0070694 A1     Mar. 5, 2020

(30) Foreign Application Priority Data

Sep. 4, 2018   (CN) .......................... 201811024817.7

(51) Int. Cl.
| | |
|---|---|
| *B60N 2/50* | (2006.01) |
| *B60R 16/023* | (2006.01) |
| *H04L 12/40* | (2006.01) |

(52) U.S. Cl.
CPC ............ *B60N 2/501* (2013.01); *B60R 16/023* (2013.01); *H04L 12/40013* (2013.01)

(58) Field of Classification Search
CPC ...... B60N 2/501; B60N 2/0232; B60N 2/509; B60N 2002/0268; B60N 2/067; B60N 2/002; B60R 16/023; H04L 12/40013
See application file for complete search history.

(56) References Cited

U.S. PATENT DOCUMENTS

| | | | |
|---|---|---|---|
| 7,070,153 B1 * | 7/2006 | Stenard ................ | B60N 2/4242 248/157 |
| 2006/0095180 A1 * | 5/2006 | Ummethala ........... | B60N 2/544 701/37 |
| 2006/0200287 A1 * | 9/2006 | Parison .................. | B60N 2/525 701/37 |

(Continued)

FOREIGN PATENT DOCUMENTS

| | | |
|---|---|---|
| DE | 19916926 A1 | 10/2000 |
| DE | 102012023931 A1 | 6/2001 |

(Continued)

OTHER PUBLICATIONS

S. Pischinger, U. Seiffert (2016). Vieweg Handbuch Manual Automotive Technology, 8th edition, Wiesbaden: Springer Fachmedien, pp. 977-979.

*Primary Examiner* — Richard M Camby
(74) *Attorney, Agent, or Firm* — Vivacqua Crane PLLC

(57) ABSTRACT

A disturbance cancellation and generation seat system includes a seat mounted to a structure of a vehicle. The seat is accelerated due to a disturbance acceleration received in the structure and transferred to the seat. A seat control unit generates a force cancellation command signal. An actuation device is connected to the structure and is in communication with the seat control unit. The actuation device in response to receipt of the force cancellation command signal induces a cancellation acceleration motion into the seat which is equal but opposite to and therefore cancels an acceleration motion of the seat induced by the disturbance acceleration.

19 Claims, 4 Drawing Sheets

(56) References Cited

U.S. PATENT DOCUMENTS

| | | | | |
|---|---|---|---|---|
| 2007/0135982 A1* | 6/2007 | Breed | ............... | B60N 2/0232 |
| | | | | 701/36 |
| 2007/0251749 A1* | 11/2007 | Breed | ............... | B60J 10/00 |
| | | | | 180/273 |
| 2008/0036185 A1* | 2/2008 | Breed | ............... | B60R 21/0152 |
| | | | | 280/734 |
| 2014/0084656 A1* | 3/2014 | Hozumi | ............... | B60N 2/06 |
| | | | | 297/344.1 |
| 2016/0082870 A1* | 3/2016 | Fujita | ............... | B60N 2/54 |
| | | | | 248/561 |
| 2016/0318442 A1 | 11/2016 | James | | |
| 2017/0136842 A1* | 5/2017 | Anderson | ............... | A61B 5/4023 |

FOREIGN PATENT DOCUMENTS

| | | |
|---|---|---|
| DE | 10013326 A1 | 9/2001 |
| DE | 10258020 B3 | 6/2004 |
| DE | 102015113499 A1 | 2/2016 |
| KR | 20130032064 A | 4/2013 |

\* cited by examiner

DISTURBANCE CANCELLATION AND GENERATION SEAT

INTRODUCTION

The present disclosure relates to systems and methods to identify and respond to occupant sensed disturbances in vehicles which are induced by power transfer system changes, vehicle system fluctuations, and varying road conditions.

For both occupant driven vehicles and autonomously driven vehicles, there are unwanted disturbances which can be sensed by the one or more vehicle occupants which are created by power transfer systems, from vehicle system operation and from road infrastructure. These disturbances include transmission gear shift events, road surface fluctuations including bumps and potholes, and motion induced forces such as from cornering and braking. These disturbances create acceleration and deceleration forces which act on the occupant, and which can detrimentally impact the occupant's travel event.

Many known electrically powered or gas/electric powered vehicles commonly provide single speed transmissions, which do not induce significant gear shift disturbances, but which do not provide optimized power plant performance. To minimize and optimize battery and motor size, multiple speed transmissions are therefore now being incorporated into such vehicles which will therefore reintroduce gear shift disturbances.

In addition, autonomously operated vehicles provide multiple sensors and systems which are required to continuously monitor for upcoming roadway and weather conditions to provide navigation input to the vehicle. Such systems therefore provide an enhanced ability to predict upcoming disturbances, however the maximum advantage offered by such abilities is not currently being utilized.

Thus, while current vehicle systems achieve their intended purpose, there is a need for a new and improved system and method for reducing disturbance accelerations felt by occupants of a motor vehicle.

SUMMARY

According to several aspects, a disturbance cancellation and generation seat system includes a seat mounted to a structure of a vehicle. The seat is accelerated due to a disturbance acceleration received in the structure and transferred to the seat. A seat control unit generates a force cancellation command signal. An actuation device is connected to the structure and is in communication with the seat control unit. The actuation device in response to receipt of the force cancellation command signal induces a cancellation acceleration motion into the seat which is equal but opposite to and therefore cancels an acceleration motion of the seat induced by the disturbance acceleration.

In another aspect of the present disclosure, a force sensor connected to the seat generating a force signal corresponding to a weight of an occupant of the seat.

In another aspect of the present disclosure, the force signal from the force sensor is converted in the seat control unit to a mass of the occupant.

In another aspect of the present disclosure, an acceleration equal but opposite to the disturbance acceleration necessary to keep a net force acting on the occupant at substantially zero is calculated in the seat control unit.

In another aspect of the present disclosure, a communication link connects the seat control unit to the actuation device.

In another aspect of the present disclosure, a vehicle control unit receives data from multiple vehicle sensors including acceleration sensors, speed sensors and ambient condition sensors.

In another aspect of the present disclosure, a Controller Area Network bus provides communication between the vehicle control unit and the seat control unit.

In another aspect of the present disclosure, the disturbance acceleration defines multiple acceleration values each defining a transmission shift event.

In another aspect of the present disclosure, the acceleration values are saved in a lookup table.

In another aspect of the present disclosure, the disturbance acceleration defines multiple accelerations transferred to the seat and thereby to the occupant via a path from one or more wheels to the structure.

According to several aspects, a method for cancelling disturbance accelerations in a vehicle seat comprises: measuring a disturbance acceleration acting to displace a seat mounted to a structure of a vehicle; generating a force cancellation command signal in a seat control unit; connecting an actuation device to the structure and in communication with the seat control unit to receive the force cancellation command signal; and inducing a cancellation acceleration motion into the seat by operation of the actuation device in response to the force cancellation signal which is equal but opposite to and therefore cancels an acceleration motion of the seat induced by the disturbance acceleration.

In another aspect of the present disclosure, the method includes: connecting a force sensor to the seat; and generating a force signal corresponding to a weight of an occupant of the seat.

In another aspect of the present disclosure, the method includes converting the weight of the occupant to a mass of the occupant.

In another aspect of the present disclosure, the method includes applying the mass of the occupant to calculate an acceleration equal but opposite to the disturbance acceleration necessary to keep a net force acting on the occupant at substantially zero in the seat control unit.

In another aspect of the present disclosure, the method includes: collecting data from multiple vehicle sensors including acceleration sensors, speed sensors and ambient condition sensors; and forwarding the data to a vehicle control unit.

In another aspect of the present disclosure, the method includes forwarding the data from the vehicle control unit to the seat control unit.

In another aspect of the present disclosure, the method includes performing an estimation step using data generated by the seat control unit prior to the generating step, the estimation step incorporating estimated values of acceleration to cancel the disturbance force.

According to several aspects, a disturbance cancellation and generation seat system includes a seat mounted to a structure of a vehicle, the seat accelerated due to a disturbance acceleration received in the structure and transferred to the seat. A force sensor connected to the seat generates a force signal corresponding to a weight of an occupant of the seat. The seat control unit converts the weight of the occupant to a mass of the occupant. A vehicle control unit receives data from multiple vehicle sensors including acceleration sensors, speed sensors and ambient condition sensors and forwards the data to the seat control unit. An actuation device is connected to the structure and is in communication with the seat control unit. The actuation device in response to receipt of a force cancellation command signal generated by the seat control unit induces a cancellation acceleration motion into the seat which is equal but opposite to and therefore cancels an acceleration motion of the seat induced by the disturbance acceleration.

In another aspect of the present disclosure, the actuation device includes a contact member which extends outwardly to contact and to displace the seat, the contact member displacing the seat in a two-directional, outward and return displacement.

In another aspect of the present disclosure, the actuation device includes a contact member which contacts and displaces the seat in a multi-directional, roll, pitch and yaw motion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
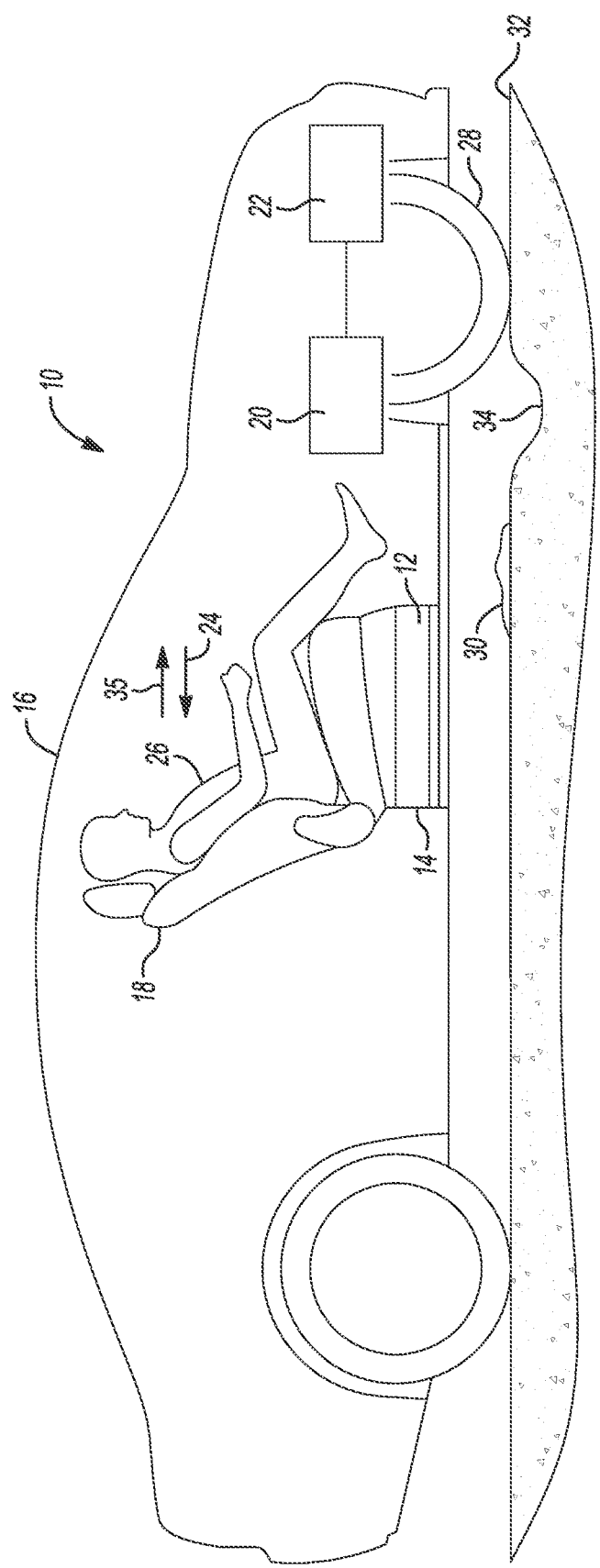
FIG. 1 is a side elevational view of a vehicle having a disturbance cancellation and generation seat system according to an exemplary embodiment.

Referring to FIG. 1, a disturbance cancellation and generation seat system 10 and method for operation includes an actuator defining an actuation device 12 mounted to a structure 14 of a vehicle 16. The vehicle 16 can be a battery electric powered vehicle, a gasoline or diesel engine powered vehicle, a gas/electric hybrid powered vehicle, an occupant manually driven vehicle, or an autonomously driven vehicle. The actuation device 12 is connected to a seat 18 which is mounted to the structure 14 of the vehicle 16. The vehicle 16 includes a transmission 20 which according to several aspects is a multiple speed transmission having two, three, or more gear shift ranges. The transmission 20 is connected to a power plant 22, which can include an electric motor and a battery, a gasoline engine, or a diesel engine.

Disturbances defined herein as disturbance accelerations 24 can be transmitted to an occupant 26 positioned on the seat 18 by structural transmission of the accelerations occurring during operation of the transmission 20 and the power plant 22. Disturbance accelerations 24 are accelerations also transferred to the seat 18 and thereby to the occupant 26 via a path from one or more wheels 28 to the structure 14 due to for example surface deformations 30 of a roadway 32 contacted by the wheels 28, or from contact of the wheels 28 with depressions 34 such as potholes. Disturbance accelerations 24 are also transferred to the seat 18 as g-force changes during driving, for example during rapid cornering, rapid acceleration or rapid braking. According to several aspects, the actuation device 12 mounted to the structure 14 of the vehicle 16 introduces a cancellation acceleration 35 acting in opposition to the disturbance acceleration 24 to minimize a force acting on the seat 18 and therefore acting on the occupant 26 of the vehicle 16.

Referring to FIG. 2 and again to FIG. 1, the disturbance cancellation and generation seat system 10 includes a vehicle control unit 36 which receives data from multiple vehicle sensors 38 such as acceleration sensors, speed sensors and ambient condition sensors. The vehicle control unit 36 controls operation of the various systems of the vehicle 16 including operation of the transmission 20 and the power plant 22. In addition, the disturbance cancellation and generation seat system 10 also includes a force sensor 40 below or attached to the structure 14 supporting the seat 18, with the force sensor 40 generating an output signal indicative of a sensed weight of the occupant 26.

The vehicle control unit 36 is in communication with the seat control unit 42 via a Controller Area Network (CAN) bus 44. The CAN bus 44 is based on a standard designed to allow microcontrollers and devices to communicate with each other. An output signal from the force sensor 40 is provided to the seat control unit 42. The force signal from the force sensor 40 equates to an occupant weight and is converted in the seat control unit 42 to a mass of the occupant 26. Based on acceleration signal input received from the vehicle control unit 36 and the force signal received from the force sensor 40 the seat control unit 42 generates force cancellation command signals which are forwarded via a communication link 46 which connects the seat control unit 42 to the actuation device 12. The actuation device 12 generates a cancellation acceleration motion into the seat 18 which is equal but opposite to and therefore cancels acceleration motion induced from the force input to the seat 18 due to the disturbance accelerations 24. The seat force sensor 40 therefore provides different force signals depending on the mass of different occupants, which is used to cancel the disturbance acceleration based on the equation: $F=MA$. Since the mass is known (measured) for the occupant based on the output from the seat force sensor 40, and the acceleration is a sensed or known value, the algorithm of the present disclosure calculates an equal but opposite acceleration necessary to keep a net force acting on the occupant 26 at substantially zero.

Figure 2:
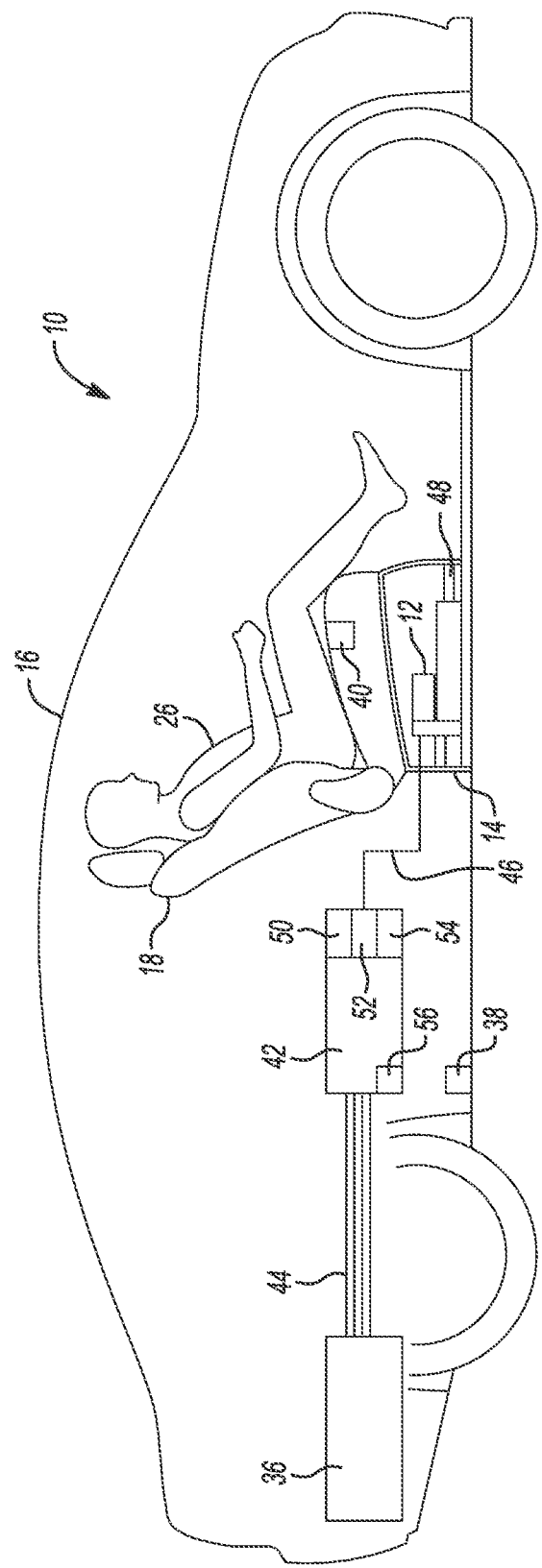
FIG. 2 is a side elevational view of the vehicle of FIG. 1, further showing control units and actuation devices for operating the disturbance cancellation and generation seat system.

According to several aspects, the actuation device 12 can be an electric motor, a hydraulic piston, a pneumatical chamber or an electric-mechanical device. The actuation device 12 includes a contact member 48 which extends outwardly to contact and to displace the seat 18. During gear shift events, the major forces acting on the occupant 26 are due to fore-aft motion. For simplicity, FIG. 2 presents a two-directional (outward and return) actuation by displacement of the contact member 48. For other cases, for example roadway motions and motion sickness inducing accelerations, actuation of the actuation device 12 can be in directed in multiple directions including x, y, z, roll, pitch and yaw. The contact member 48 can be for example a traditional ball-screw mechanism for example to translate motor rotation from a motor of the actuation device 12 into translational movement.

The seat control unit 42 may include a controller 50. The controller 50 which is a non-generalized, electronic control device has a preprogrammed digital computer or processor 52, memory or non-transitory computer readable medium 54 used to store data such as control logic, software applications, instructions, computer code, data, lookup tables, etc., and a transceiver 56 or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code. The processor 52 is configured to execute the code or instructions. The transceiver 56 may also be configured to wirelessly communicate with a hotspot using Wi-Fi protocols under IEEE 802.11x.

Referring to FIG. 3 and again to FIGS. 1 and 2, a flow diagram 58 presents exemplary process steps taken by the disturbance cancellation and generation seat system 10. In an initial input step 60, inputs are collected from various sources including input signals from the power train including the transmission 20 and the power plant 22, from vehicle systems, from vehicle infrastructure, and from the vehicle occupant. Such inputs include but are not limited to gear shift events, signals indicating road surface conditions such as the surface deformations 30 and the depressions 34, motion forces acting on the occupant such as vehicle acceleration and deceleration and turning forces obtained for example from the one or more vehicle sensors 38, and occupant inputs such as occupant preferences. Occupant preferences may include variations in the degree of the cancellation acceleration 35 to achieve different occupant "feel" such as a smoother ride feel, or a stiffer sport ride feel.

Data collected in the initial input step 60 is fed to the vehicle control unit 36 which continuously monitors for changes in the data. Updated information is continuously fed from the vehicle control unit 36 to the seat control unit. As previously noted, output signals from the force sensor 40 are also provided to the seat control unit 42 which are converted in the seat control unit 42 to a mass of the occupant 26. When acceleration events are sensed which would generate the disturbance accelerations 24 a command force calculation step 64 is conducted. Based on acceleration signal input and the force signal received from the force sensor 40 a measured force is calculated. In addition, a commanded force 66 is calculated having an acceleration aspect 68 that is equal but opposite to the disturbance accelerations 24 acting on the seat 18.

Figure 8:
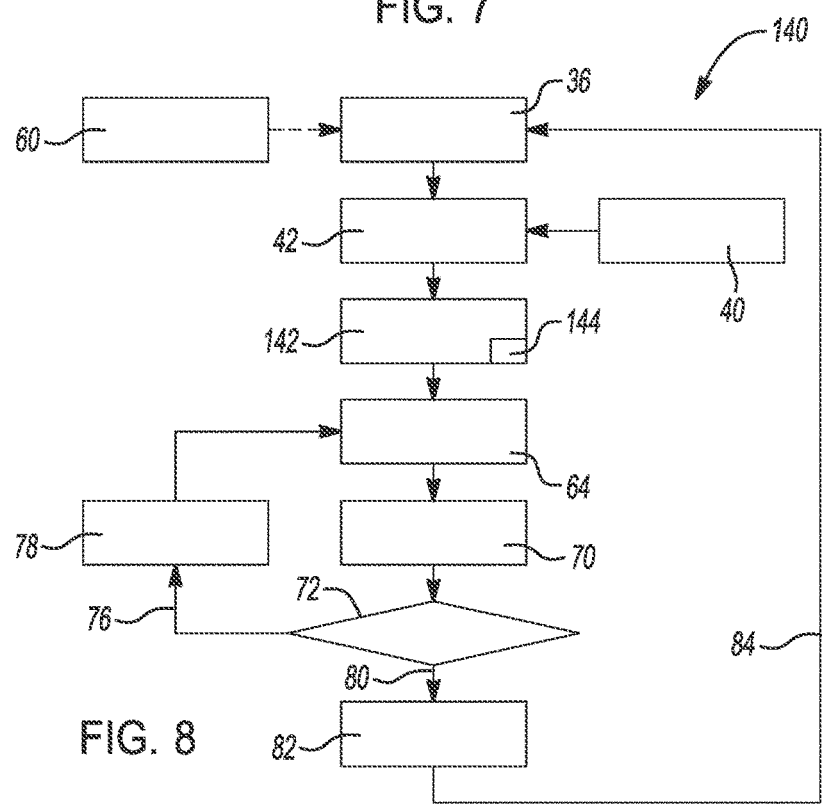
FIG. 8 is a flow diagram modified from the flow diagram of FIG. 3 to add an estimation step.

In an actuation step 70 the calculated commanded force 66 is converted to a commanded force signal. The commanded force signal is sent to the actuation device 12 which generates the cancellation acceleration 35 to displace the seat 18 away from a default position. The varying acceleration rate is a calibrated acceleration from the vehicle 16, which for example is obtained from a look-up table described in reference to FIG. 8 and is therefore known. The actuator of the actuation device 12 therefore multiplies the acceleration by the passenger weight to generate the force command. A relative movement between the seat 18 and the vehicle 16 is projected to be small, for example 1.0 to 3.0 mm, therefore the occupant 26 will sense only very limited force cancellation motion, with system response times of approximately 100 ms to 200 ms or less.

In a confirmation step 72 a query is conducted to determine if the measured force acting on the seat 18 minus the commanded force 66 is less than a predetermined threshold 74. If a negative response 76 is generated to this query, the commanded force 66 is not sufficient to negate the measured force, and a tune command signal 78 is generated and the command force calculation step 64 is repeated.

If a positive response 80 is generated to this query, the commanded force 66 is sufficient to negate the measured force, and a seat return command 82 is generated to return the seat 18 to the default position. A monitoring command signal 84 is then generated and sent to the vehicle control unit 36 indicating an end to the seat displacement event and to return the vehicle control unit 36 to its normal signal monitoring status.

Figure 4:
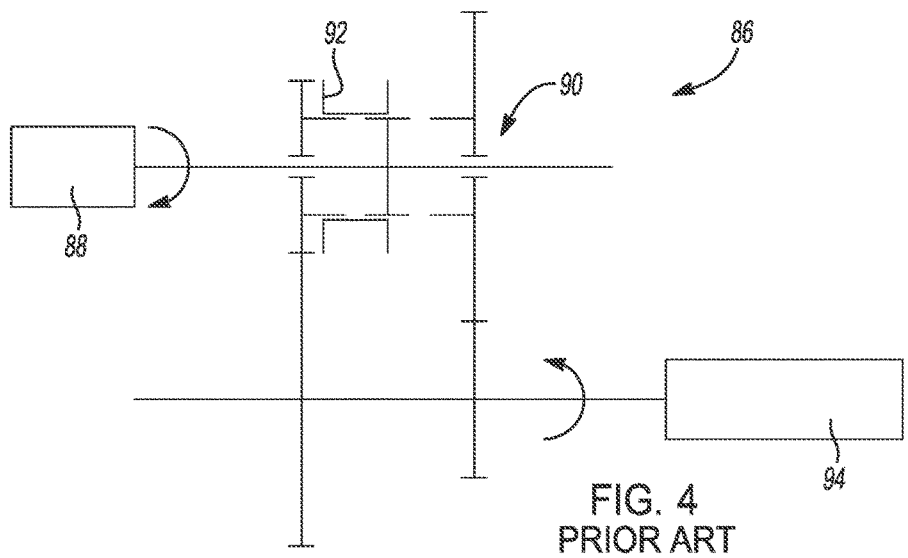
FIG. 4 is a diagrammatic presentation of a vehicle two speed transmission of known design.

Referring to FIG. 4, a known two-speed transmission system 86 is presented having an electric motor 88 connected to a two-speed transmission 90 which is actuated by a synchronizer 92. A final reduction 94 is produced.

Referring to FIG. 5 and again to FIG. 4, a graph 96 presents acceleration 98 versus time 100 for an exemplary gearshift of the transmission 90 presented in FIG. 4. An acceleration curve 102 identifies the acceleration of an initial or previous gear 104, which transitions in an acceleration reduction portion 106 to a disengagement torque 108. A synchronization torque portion 110 then occurs which precedes an engagement torque portion 112 as the target gear is engaged. An acceleration ramp-up portion 114 then follows which ends when a target gear torque 116 is achieved. Exemplary ones of the disturbance accelerations 24 occur during a transition portion 118 of the acceleration curve 102 due to acceleration changes. These disturbance accelerations 24 are felt at the seat 18 during the gear shift event from the previous gear to the target gear.

Figure 3:
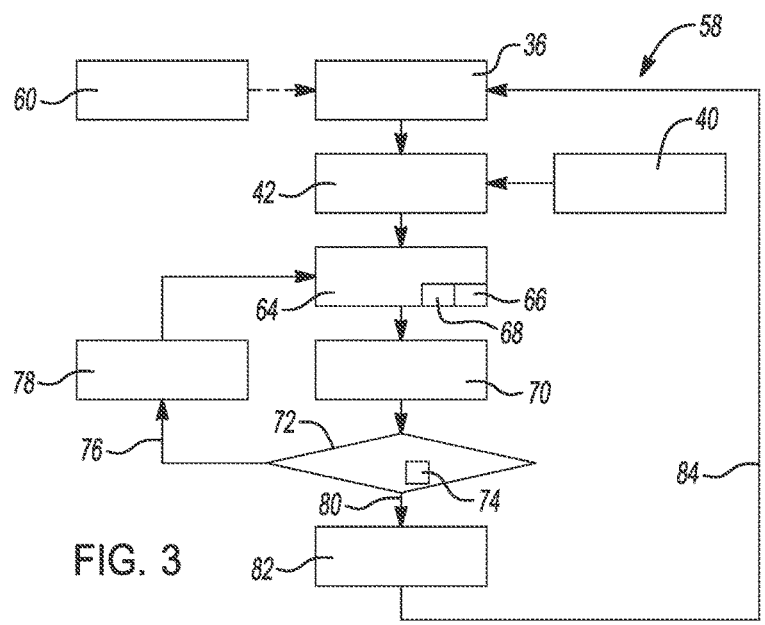
FIG. 3 is a flow diagram of the disturbance cancellation and generation seat system of the present disclosure.
Figure 5:
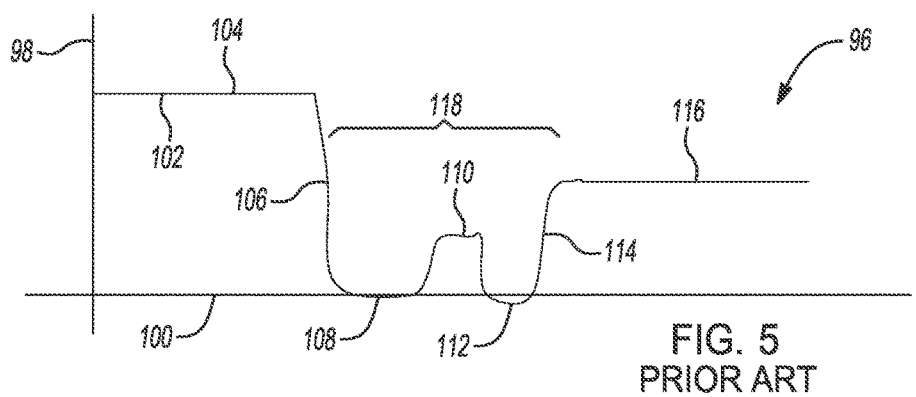
FIG. 5 is a graph presenting an acceleration torque versus time curve for the transmission of FIG. 4.

Referring to FIG. 6 and again to FIGS. 1 through 5, a graph 120 presents acceleration 122 versus time 124 for an acceleration curve 126 having a transition portion 128 corresponding to the acceleration aspect 68 discussed in reference to FIG. 3 superimposed onto the acceleration curve 102 of FIG. 5. The transition portion 128 provides acceleration values substantially equal but opposite to the acceleration values of the transition portion 118. Given the known mass of the occupant 26 of the vehicle 16, a commanded force generated using the acceleration values of the transition portion 128 will be equal to and cancel a measured force observed applying the same occupant mass to the acceleration values of the torque curve 102 of FIG. 5.

Figure 6:
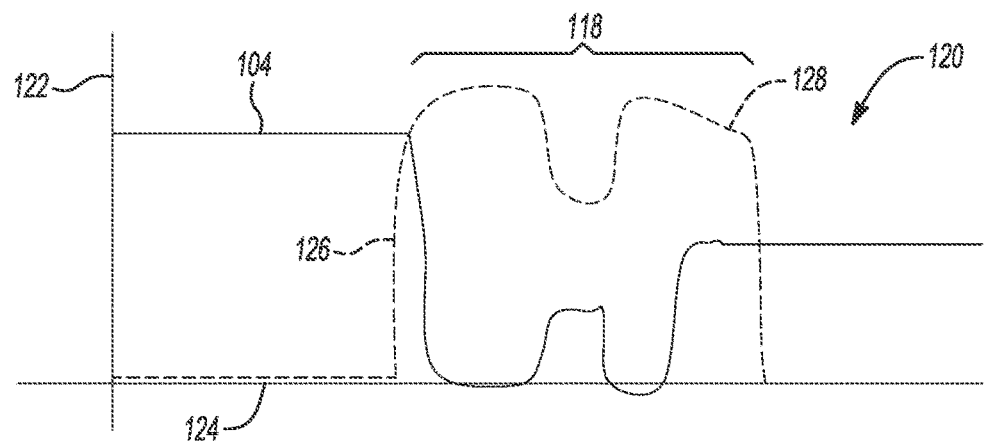
FIG. 6 is a graph presenting acceleration versus time curve generated using the disturbance cancellation and generation seat system of the present disclosure overlayed onto the acceleration versus time curve presented in FIG. 5.
Figure 7:
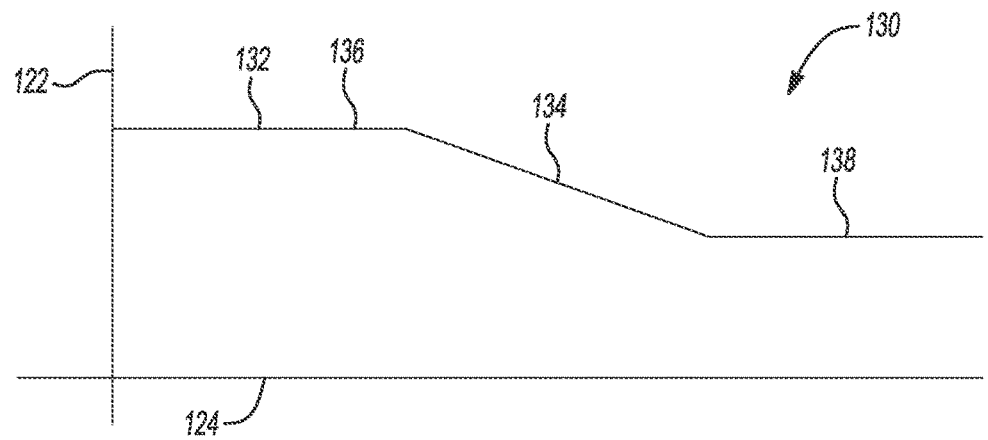
FIG. 7 is a graph of a smoothed acceleration versus time curve for an exemplary transmission gear shift event incorporating the disturbance cancellation and generation seat system of the present disclosure.

Referring to FIG. 7 and again to FIG. 6, a graph 130 presents acceleration 122 versus time 124 for a "smoothed" curve 132 presenting an acceleration transition portion 134 derived from super-positioning the transition portion 128 calculated using the steps identified in FIG. 3 and the transition portion 118 from an actual gear shift. The acceleration transition portion 134 smoothly transitions the acceleration between a previous gear portion 136 and a target gear portion 138, and thereby cancels the disturbance accelerations 24 that would otherwise be transmitted to the occupant 26 positioned on the seat 18.

Referring to FIG. 8 and again to FIG. 3, a flow diagram 140 is modified from the flow diagram 58 and presents exemplary process steps taken by another aspect of the disturbance cancellation and generation seat system 10. Because many of the steps of the flow diagram 58 are repeated in the flow diagram 140, only the differences will be discussed. An estimation step 142 is performed using data generated by the seat control unit 42 prior to the command force calculation step 64 being conducted. The estimation step 142 allows estimated values of acceleration to be incorporated to cancel predicted disturbance forces. For example, known acceleration values from given transmission gear shifts, for example between a first gear and a second gear at different engine torque values are saved in a lookup table 144. When a gear shift between the first gear and the second gear is called for in the vehicle control unit 36, the seat control unit 42 calls for the anticipated acceleration values to be withdrawn from the lookup table 144 which are used to determine the calculated commanded force 66 necessary to cancel the disturbance accelerations 24 which would normally occur from this gear shift event.

The estimation step 142 may be applied for example in autonomously driven vehicles where advance sensor data is available. Advance sensor data may be available for example from a global positioning system (GPS) high definition map, which indicates known surface deformations 30 of the roadway 32 are upcoming as the vehicle 16 travels to a predefined destination. The calculated commanded force 66 necessary to cancel the disturbance accelerations 24 anticipated by interaction with the known surface deformations 30 can be determined ahead of reaching the known surface deformations 30.

As used herein, the terms "forward", "rear", "inner", "inwardly", "outer", "outwardly", "above", and/or "below" are terms used relative to the orientation of the motor vehicle 16 as shown in the drawings of the present application. Thus, "forward" refers to a direction toward a front of a motor vehicle, "rearward" refers to a direction toward a rear of a motor vehicle, "inner" and "inwardly" refers to a direction towards the interior of a motor vehicle, and "outer" and "outwardly" refers to a direction towards the exterior of a motor vehicle, "below" refers to a direction towards the bottom of the motor vehicle, and "above" refers to a direction towards a top of the motor vehicle.

Additionally, in the claims and specification, certain elements may be designated as "first", "second", "third", or "fourth". These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function.

A disturbance cancellation and generation seat system and method of the present disclosure offers several advantages. These include provision of an actuation device connected to structure of a vehicle which induces a cancellation acceleration motion into a seat which is equal but opposite to and therefore cancels an acceleration motion of the seat induced by a disturbance acceleration. A seat control unit generates a force cancellation command signal which initiates operation of the actuation device. Disturbance accelerations including those from transmission shift events and road disturbances can be identified and canceled.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A disturbance cancellation and generation seat system, comprising:
a seat mounted to a structure of a vehicle, the seat accelerated due to a disturbance acceleration received in the structure and transferred to the seat, wherein the disturbance acceleration defines multiple acceleration values each defining a transmission shift event;
a seat control unit generating a force cancellation command signal; and
an actuation device connected to the structure and in communication with the seat control unit, the actuation device in response to receipt of the force cancellation command signal inducing a cancellation acceleration motion into the seat which is equal but opposite to and therefore cancels an acceleration motion of the seat induced by the disturbance acceleration.

2. The disturbance cancellation and generation seat system of claim 1, further including a force sensor connected to the seat generating a force signal corresponding to a weight of an occupant of the seat.

3. The disturbance cancellation and generation seat system of claim 2, wherein the force signal from the force sensor is converted in the seat control unit to a mass of the occupant.

4. The disturbance cancellation and generation seat system of claim 3, wherein an acceleration equal but opposite to the disturbance acceleration necessary to keep a net force acting on the occupant at substantially zero is calculated in the seat control unit.

5. The disturbance cancellation and generation seat system of claim 1, further including a communication link connecting the seat control unit to the actuation device.

6. The disturbance cancellation and generation seat system of claim 1, further including a vehicle control unit receiving data from multiple vehicle sensors including acceleration sensors, speed sensors and ambient condition sensors.

7. The disturbance cancellation and generation seat system of claim 6, further including a Controller Area Network bus forwarding communication between the vehicle control unit and the seat control unit.

8. The disturbance cancellation and generation seat system of claim 1, wherein the acceleration values are saved in a lookup table.

9. The disturbance cancellation and generation seat system of claim 1, wherein the disturbance acceleration further defines multiple accelerations transferred to the seat and thereby to an occupant of the seat via a path from one or more wheels to the structure.

10. A method for cancelling disturbance accelerations in a vehicle seat, comprising:
measuring a disturbance acceleration acting to accelerate a seat mounted to a structure of a vehicle, wherein the disturbance acceleration defines multiple acceleration values each defining a transmission shift event;
generating a force cancellation command signal in a seat control unit;

connecting an actuation device to the structure and in communication with the seat control unit to receive the force cancellation command signal; and inducing a cancellation acceleration motion into the seat by operation of the actuation device in response to the force cancellation signal which is equal but opposite to and therefore cancels an acceleration motion of the seat induced by the disturbance acceleration.

11. The method for cancelling disturbance accelerations in a vehicle seat of claim 10, further including:

connecting a force sensor to the seat; and generating a force signal corresponding to a weight of an occupant of the seat.

12. The method for cancelling disturbance accelerations in a vehicle seat of claim 11, further including converting the weight of the occupant to a mass of the occupant.

13. The method for cancelling disturbance accelerations in a vehicle seat of claim 12, further including applying the mass of the occupant to calculate an acceleration equal but opposite to the disturbance acceleration necessary to keep a net force acting on the occupant at substantially zero in the seat control unit.

14. The method for cancelling disturbance accelerations in a vehicle seat of claim 10, further including:

collecting data from multiple vehicle sensors including acceleration sensors, speed sensors and ambient condition sensors; and forwarding the data to a vehicle control unit.

15. The method for cancelling disturbance accelerations in a vehicle seat of claim 14, further including forwarding the data from the vehicle control unit to the seat control unit.

16. The method for cancelling disturbance accelerations in a vehicle seat of claim 10, further including performing an estimation step using data generated by the seat control unit prior to the generating step, the estimation step incorporating estimated values of acceleration to cancel the disturbance acceleration.

17. A disturbance cancellation and generation seat system, comprising:

a seat mounted to a structure of a vehicle, the seat accelerated due to a disturbance acceleration received in the structure and transferred to the seat, wherein the disturbance acceleration defines multiple acceleration values each defining a transmission shift event;

a force sensor connected to the seat generating a force signal corresponding to a weight of an occupant of the seat;

a seat control unit converting the weight of the occupant to a mass of the occupant;

a vehicle control unit receiving data from multiple vehicle sensors including acceleration sensors, speed sensors and ambient condition sensors and forwarding the data to the seat control unit; and an actuation device connected to the structure and in communication with the seat control unit, the actuation device in response to receipt of a force cancellation command signal generated by the seat control unit inducing a cancellation acceleration motion into the seat which is equal but opposite to and therefore cancels an acceleration motion of the seat induced by the disturbance acceleration.

18. The disturbance cancellation and generation seat system of claim 17, wherein the actuation device includes a contact member which extends outwardly to contact and to displace the seat, the contact member displacing the seat in a two-directional, outward and return displacement.

19. The disturbance cancellation and generation seat system of claim 17, wherein the actuation device includes a contact member which contacts and displaces the seat in a multi-directional, roll, pitch and yaw motion.

\* \* \* \* \*